United States Patent
Justice

[15] 3,639,846
[45] Feb. 1, 1972

[54] TANDEM SAMPLING CONTROLLER USING DELAYED OPERATION OF PLURAL SAMPLING GATES

[72] Inventor: Gregory Justice, Mountain View, Calif.
[73] Assignee: Hewlett-Packard Company, Palo Alto, Calif.
[22] Filed: Mar. 11, 1970
[21] Appl. No.: 18,649

[52] U.S. Cl. ............................................. 328/151, 328/67
[51] Int. Cl. ................................................. H03k 17/00
[58] Field of Search ........................................... 328/151

[56] References Cited

UNITED STATES PATENTS

| | | | |
|---|---|---|---|
| 3,011,129 | 11/1961 | Magleby et al. | 328/58 X |
| 3,314,014 | 4/1967 | Perkins | 328/151 |
| 3,414,818 | 12/1968 | Reidel | 328/151 |

Primary Examiner—Donald D. Forrer
Assistant Examiner—Harold A. Dixon
Attorney—A. C. Smith

[57] ABSTRACT

A signal sampler is arranged to sample the output of a preceding signal sampler to produce a DC control signal having extremely low-level amplitude variations.

3 Claims, 1 Drawing Figure

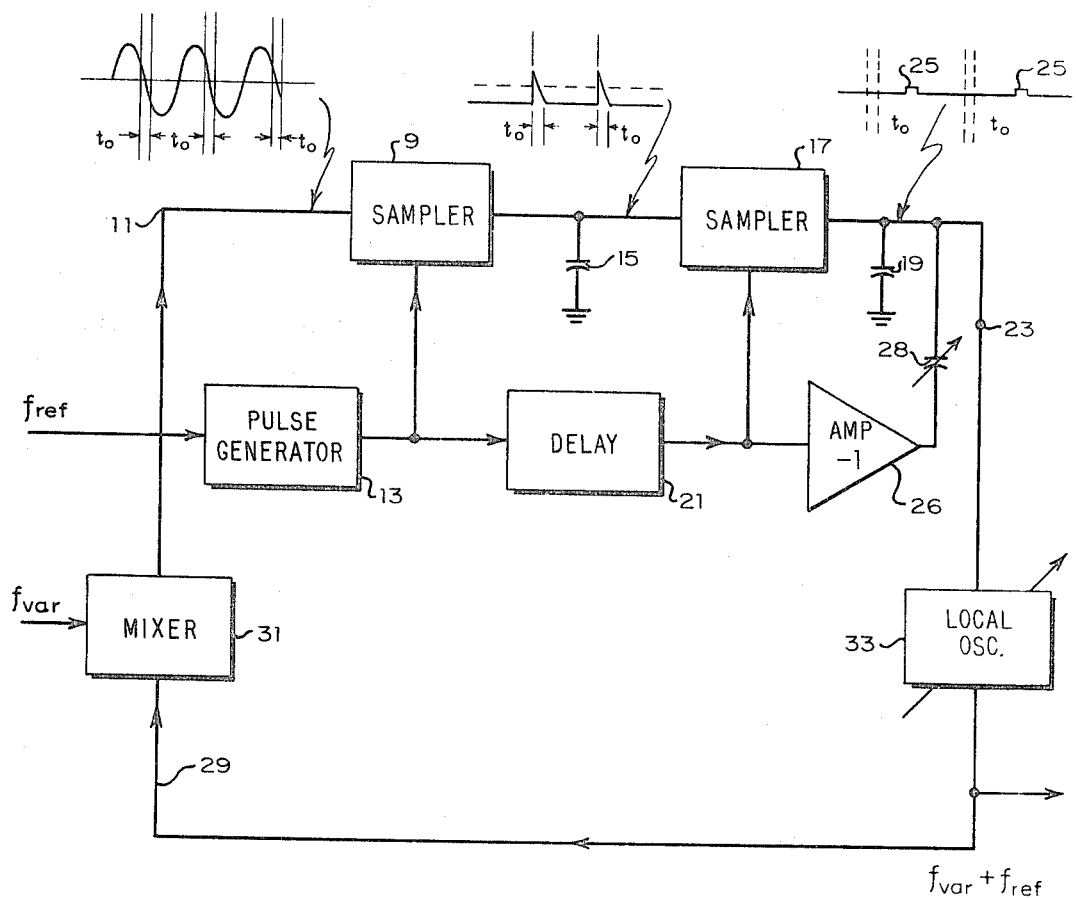

TANDEM SAMPLING CONTROLLER USING DELAYED OPERATION OF PLURAL SAMPLING GATES

BACKGROUND OF THE INVENTION

Certain known control circuits use samplers or harmonic mixers to compare a reference signal frequency with an applied signal frequency to produce an output signal indicative of the instantaneous phase relationship between the two signal frequencies. However, the output from these samplers is typically rich in harmonic components and, accordingly, requires elaborate filtering to provide a steady output for use as a control signal.

SUMMARY OF THE INVENTION

In the present invention, an additional sampler is connected to sample the output of a preceding sampler in order to obviate the need for extensive filtering typically required to smooth out the fluctuations normally present in the output of a single sampler. The output of the second sampler thus contains the desired steady signal component and substantially no signal variations. Sampler feed-through which may contribute signal variation at the output of the second sampler may be compensated for by capacitive balancing circuitry.

DESCRIPTION OF THE DRAWING

The drawing is a block diagram of the tandem sampling controller of the present invention.

A signal sampler 9 is connected to receive an applied signal on line 11 and a sampling trigger signal from pulse generator 13 for producing a sample pulse having an amplitude substantially equal to the amplitude of the applied signal at the instant the pulse generator 13 produces a sampling trigger signal. The sample pulse is applied to a pulse stretcher or amplitude-storing circuit including a capacitor 15 and is also applied to the input of another sampler 17. The output of sampler 17 is also applied to a pulse stretcher or amplitude-storing circuit including a capacitor 19.

Samplers 9 and 17 are conventional elements described in the literature (see, for example, U.S. Pat. No. 3,241,076, entitled SIGNAL SAMPLING CIRCUITS etc., issued on Mar. 15, 1966, to K. B. Magleby and W. M. Grove). These samplers typically produce sample pulses that are less than one microsecond wide e.g., $t_o \leq 1\mu$ sec.) so that after one microsecond, the amplitude-storing circuit at the output of a sampler retains the final value of a sample pulse until the next sample pulse is produced. The resulting waveform present at the amplitude-storing circuit following the first sampler 9 thus contains in the width of a sample pulse (i.e., within $t_o$) a portion of the waveshape of the applied signal appearing on conductor 11. The final value of the sampled waveshape at the end of the sampling period establishes the baseline value which is stored until the next sample pulse is produced, as shown in the drawing. The disadvantage encountered with sampled and stored signal of this type is that the signal variations about the baseline value may introduce undesirable effects when used as a control signal, say, for a signal-controlled oscillator. Such signal variations may produce undesirable frequency modulations and, accordingly, would have to be well filtered before being used as a control signal.

In accordance with the present invention, such filtering requirements are substantially reduced by operating the second sampler 17 to sample the stored output of the first sampler. Thus, delay network 21 which may be a delay line or conventional multivibrator circuit applies the sample trigger signal from pulse generator 13 to the second sampler 17 at a selected delay time after the sample trigger signal is applied to the first sampler 9. In practice, this delay time is about 4 microseconds to assure that sampler 17 samples the baseline value of the stored output well after signal variations due to operation of sampler 9 have passed. As a result, the stored output appearing on the amplitude-storing circuit including capacitor 19 ideally should have a steady value indicative of the stored baseline value appearing on the amplitude-storing circuit associated with the first sampler 9. In practice, however, some perturbations 25 due to capacitive feed-through of the sampling trigger signal applied to sampler 17 from delay network 21 may appear at the output 23. These minor perturbations 25 from the steady value of stored signal amplitude may be substantially eliminated by the compensating circuit connected, as shown. This circuit included an inverting amplifier 26 and a variable capacitor 28 for capacitively coupling to the output 23 a selectable inverted portion of the sampling trigger signal applied to the sampler 17. In this way, perturbations in the output signal due to capacitive feed-through of the sampling trigger signal may be cancelled out.

In the illustrated embodiment of the present tandem sampling controller, the signal applied to the first sampler 9 is the modulation product of a variable frequency input $f_{var}$ and a local signal frequency 29 which are mixed in mixer 31. In this embodiment the local oscillator 33 is connected to receive the control signal at output 23 for producing a signal frequency representative of the amplitude of the applied control signal. Also, the pulse generator in this embodiment 13 may be triggered at a selected rate determined by an applied reference frequency $f_{ref}$. Accordingly, the illustrated embodiment of the present invention is capable of controlling the local oscillator 33 to produce an output signal frequency 29 which is always separated in frequency from the variable frequency input $f_{var}$ by the value of the reference frequency $f_{ref}$. In proper operation, the local oscillator 33 thus remains phase locked to the modulation product of the variable frequency and reference frequency inputs $f_{var}$ and $f_{ref}$.

I claim:
1. Tandem sampling controller apparatus comprising:
   first and second samplers, each having an output and a signal input and a sampling trigger input for producing at the output a sample pulse having an amplitude representative of the amplitude of a signal applied to the signal input at the time a sampling trigger signal is applied to the sampling trigger input thereof;
   first and second signal storing means connected respectively to the outputs of the first and second samplers for storing the amplitude of sample pulses between sampling times;
   sample trigger generating means connected to the sampling trigger input of the first sampler for applying sampling trigger signals thereto at selected sampling times;
   means connecting the signal input of the second sampler to receive the stored sample pulses from the first signal storing means;
   delay means connected to the sample trigger generating means for applying a sampling trigger signal to the sampling trigger input of the second sampler a predetermined time interval after each sampling trigger signal applied to the sampling trigger input of the first sampler;
   a utilization circuit including a signal-controlled oscillator for producing an output frequency representative of the amplitude of the stored signal received from the second signal storing means; and
   circuit means connected to the signal input of the first sampler for applying thereto as the signal to be sampled a signal which is representative of the output frequency from said oscillator for controlling said output frequency about a selected frequency value.

2. Tandem sampling controller apparatus as in claim 1 wherein:
   said circuit means includes a signal mixer having an input connected to receive the output frequency from said oscillator and having another input connected to receive an applied signal frequency and having an output connected to the signal input of the first sampler for applying thereto a modulation product of signal frequencies applied to the inputs of said signal mixer.

3. Tandem sampling controller apparatus comprising:
   first and second samplers, each having an output and a signal input and a sampling trigger input for producing at the output a sample pulse having an amplitude representative of the amplitude of a signal applied to the signal input at the time a sampling trigger signal is applied to the sampling trigger input thereof;

first and second signal storing means connected respectively to the outputs of the first and second samplers for storing the amplitude of sample pulses between sampling times;

circuit means connected to the signal input for applying thereto a signal to be sampled;

sample trigger generating means connected to the sampling trigger input of the first sampler for applying sampling trigger signals thereto at selected sampling times;

means connecting the signal input of the second sampler to receive the stored sample pulses from the first signal storing means;

delay means connected to the sample trigger generating means for applying a sampling trigger signal to the sampling trigger input of the second sampler a predetermined time interval after each sampling trigger signal applied to the sampling trigger input of the first sampler;

compensating means including a capacitor and an inverting amplifier having an input connected to receive sampling trigger signals from said delay means and an output connected through said capacitor to said second signal storing means for applying compensating signal thereto to decrease signal perturbations appearing at the second signal storing means; and a utilization circuit connected to respond to the stored signal received from the second signal storing means.

* * * * *